(12) United States Patent
Nishizawa et al.

(10) Patent No.: US 8,391,654 B2
(45) Date of Patent: Mar. 5, 2013

(54) WAVELENGTH SELECTION SWITCH

(75) Inventors: Toshiki Nishizawa, Yokohama (JP); Isao Nishi, Yokohama (JP); Yuji Mitsuhashi, Yokohama (JP)

(73) Assignee: NTT Electronics Corporation, Kanagawa (JP)

( * ) Notice: Subject to any disclaimer, the term of this patent is extended or adjusted under 35 U.S.C. 154(b) by 205 days.

(21) Appl. No.: 13/000,174

(22) PCT Filed: Jun. 18, 2009

(86) PCT No.: PCT/JP2009/061117
§ 371 (c)(1),
(2), (4) Date: Dec. 20, 2010

(87) PCT Pub. No.: WO2010/001734
PCT Pub. Date: Jan. 7, 2010

(65) Prior Publication Data
US 2011/0103739 A1    May 5, 2011

(30) Foreign Application Priority Data

Jul. 4, 2008   (JP) .................................. 2008-175386

(51) Int. Cl.
*G02B 6/35* (2006.01)
*G02B 6/32* (2006.01)

(52) U.S. Cl. ...................................................... 385/18

(58) Field of Classification Search ........................ None
See application file for complete search history.

(56) References Cited

U.S. PATENT DOCUMENTS 8,045,854 B2 * 10/2011 Colbourne ...................... 398/48

FOREIGN PATENT DOCUMENTS

| JP | 2003-101479 | 4/2003 |
|---|---|---|
| JP | 2005-257772 | 9/2005 |
| JP | 2006-133298 | 5/2006 |
| JP | 2006-178207 | 7/2006 |
| JP | 2006-276216 | 10/2006 |
| JP | 2006-284740 | 10/2006 |
| JP | 2007-183370 | 7/2007 |
| WO | 2008/111444 A1 | 9/2008 |

OTHER PUBLICATIONS

International Search Report dated Jul. 14, 2009 for corresponding International Patent Application No. PCT/US2009/061117 (w/ English abstract).
International Preliminary Report on Patentability for corresponding International Patent Application No. PCT/JP2009/061117 (with English translation).
Extended Search Report dated Oct. 12, 2012 for corresponding European Patent Application No. 09773312.5-1524/2299309.

*Primary Examiner* — Sarah Hahm
(74) *Attorney, Agent, or Firm* — Ohlandt, Greeley, Ruggiero, & Perle, L.L.P.

(57) ABSTRACT

A wavelength selection switch that includes an optical component for adjusting an optical path with an image magnification of M that is provided between a second imaging position and a mirror array. Therefore, it is possible to provide a small wavelength selection optical switch with a short optical path length that is capable of reducing the focal length of each of a first lens and a second lens to 1/M while maintaining the structure of the spectral element, the fiber array, and the mirror array according to the related art. Since the optical path length is reduced, it is possible to reduce the number of reflecting mirrors used to convert an optical path and thus reduce the size of a housing. Therefore, it is possible to reduce manufacturing costs.

10 Claims, 6 Drawing Sheets

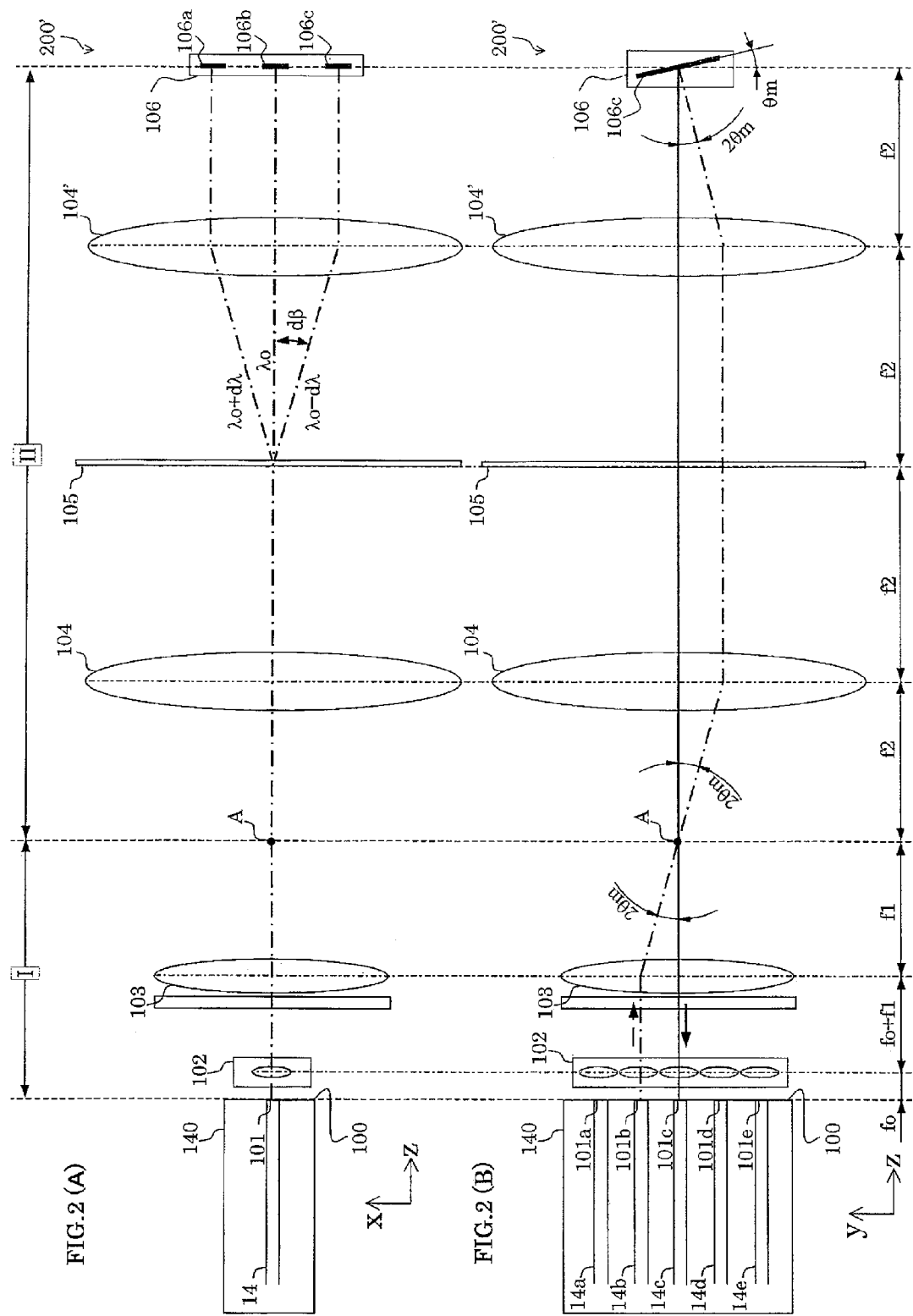

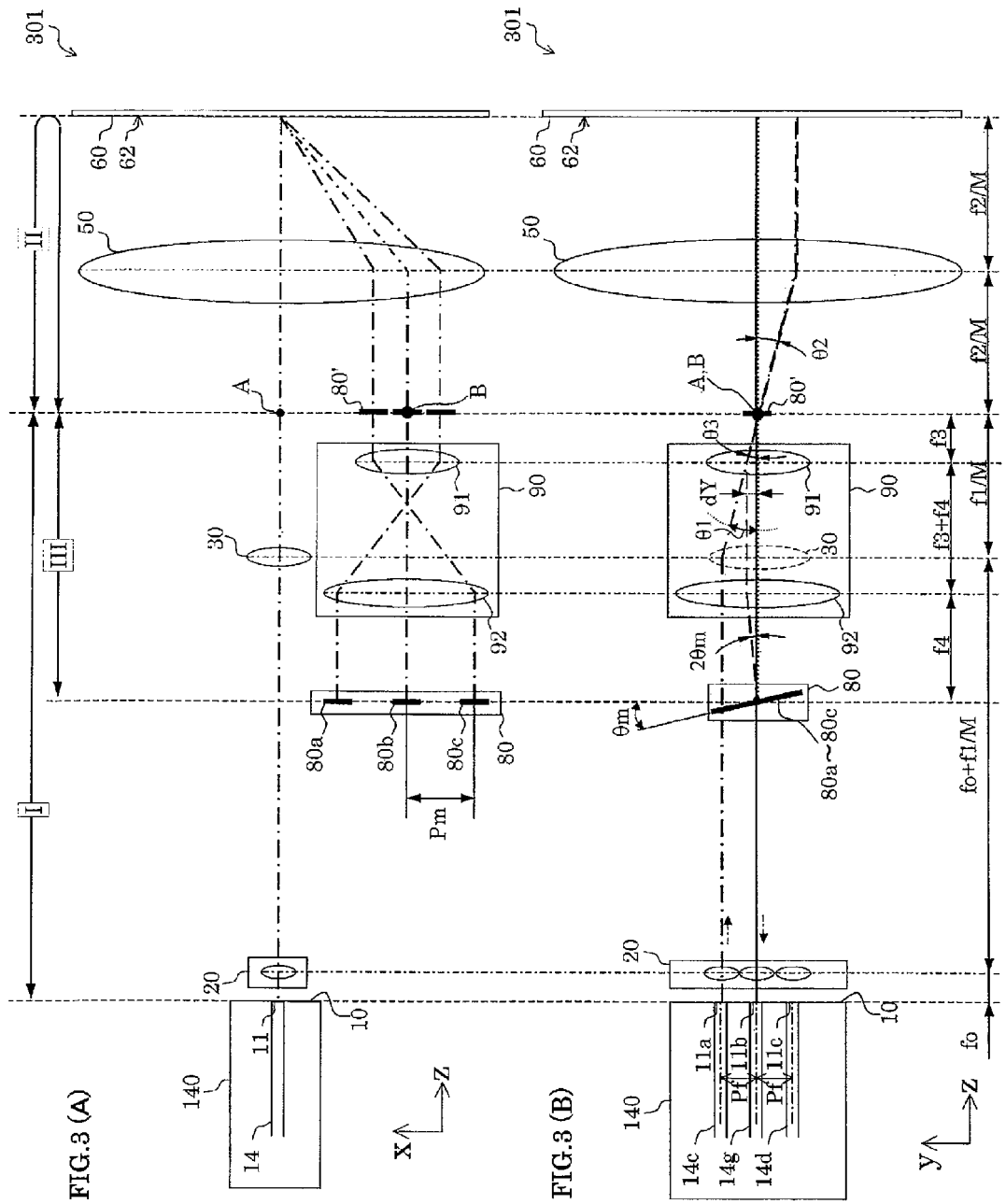

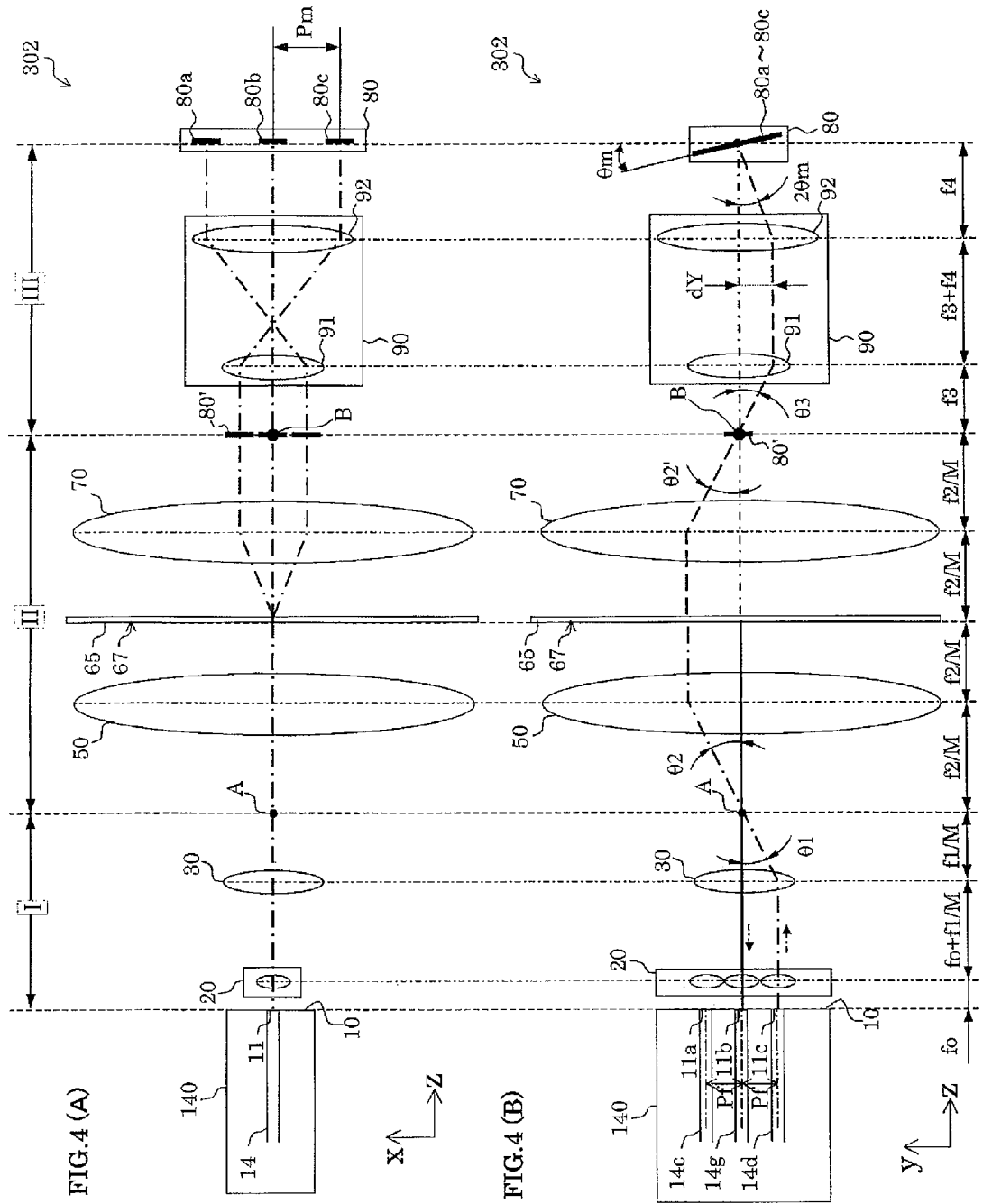

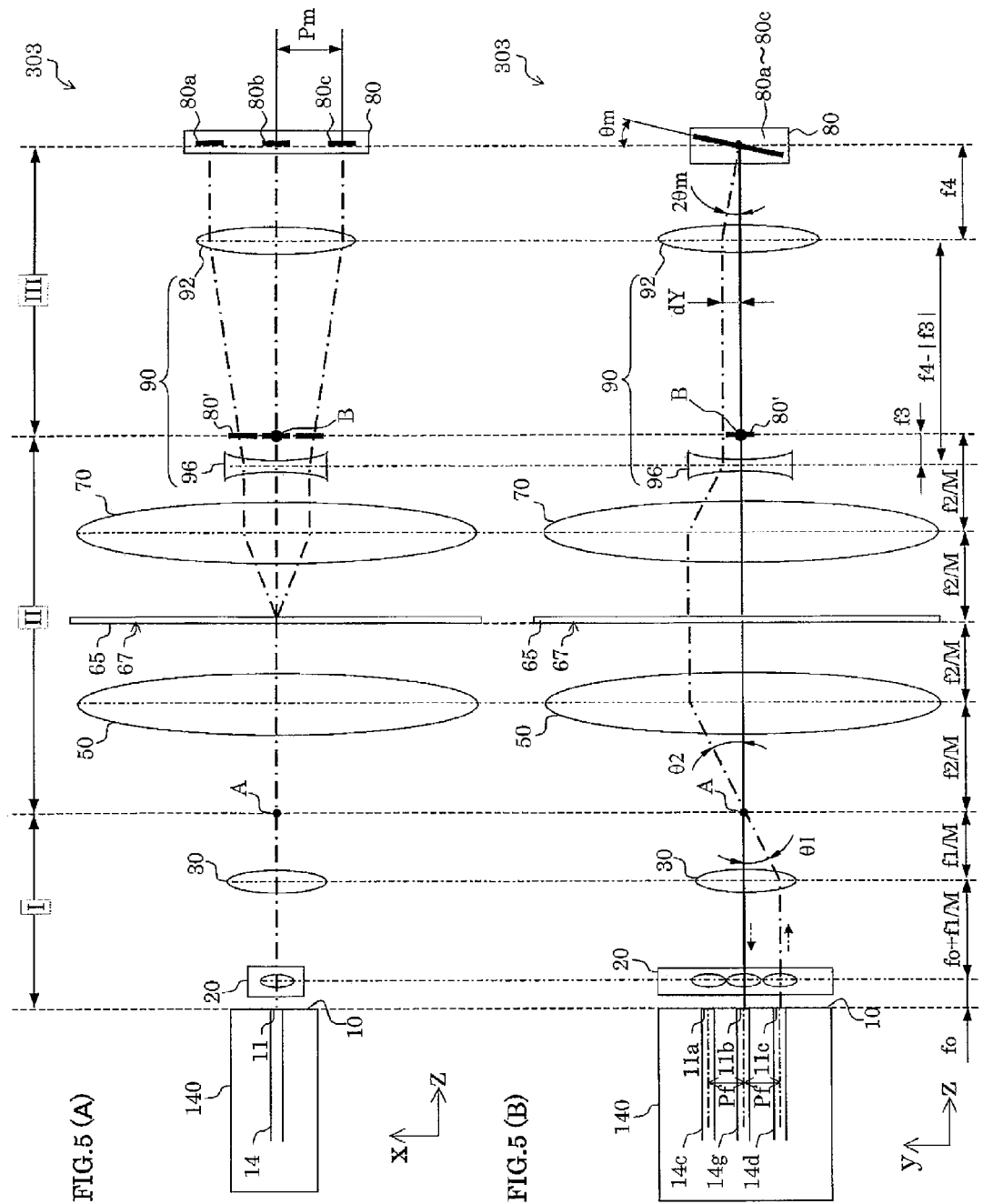

WAVELENGTH SELECTION SWITCH

BACKGROUND

1. Field of the Disclosure

The present disclosure relates to a wavelength selection switch capable of branching or coupling light components with different wavelengths in optical wavelength multiplex communication.

2. Discussion of the Background Art

With the spreading of optical wavelength multiplex communication, a wavelength selection switch that multiplexes or demultiplexes an optical signal for each wavelength has been used as a key device in optical communication.

FIG. 1 is a diagram schematically illustrating the structure of a wavelength selection switch according to the related art. Input/output ports 101 indicate all input/output ports (in FIGS. 1 and 2, input/output ports 101a to 101e) in an input/output end 100. And waveguides 14 indicate all waveguides (in FIGS. 1 and 2, waveguides 14a to 14e) in a fiber array 140.

A wavelength selection switch 200 shown in FIG. 1 includes: a lens array 102 that converts light output from the input/output ports 101 of the input/output end 100 arranged at a focal position into parallel light; a first lens 103 with a high numerical aperture that focuses light emitted from the lens array 102; a second lens 104 that is provided so as to have the same focal position as the first lens 103; a spectral element 105 that reflects light emitted from the second lens 104 at different angles for each wavelength; and a mirror array 106 that is provided at the focal position of the second lens 104 and reflects light traveling from the spectral element 105 through the second lens 104 to the second lens 104 at an arbitrary angle (for example, see Patent Documents 1 to 3).

In this way, the light components reflected at an arbitrary angle by the mirror array 106 are focused on different input/output ports for each wavelength according to the inclination angle of each micromirror in the mirror array 106. As such, the first lens 103 has a function of changing the angle of light that has been reflected from the spectral element 105 again and then passed through the second lens 104 among the light components reflected by the mirror array 106 and giving an offset to the optical axis of light from the input/output ports 101.

FIG. 2 is a diagram schematically illustrating the structure of a wavelength selection switch 200' having a transmissive spectral element 105' instead of the reflective spectral element 105 shown in FIG. 1. FIG. 2(a) shows the wavelength selection switch 200' in the x-z plane and FIG. 2(b) shows the wavelength selection switch 200' in the y-z plane. However, in FIG. 2, for simplicity of illustration, both the incident angle and the diffraction angle of the transmissive spectral element 105 are approximately zero, but both the incident angle and the diffraction angle are actually close to 45 degrees. Components having the same functions as those of the wavelength selection switch 200 shown in FIG. 1 are denoted by the same reference numerals. A third lens 104' shown in FIG. 2 has the same function as the second lens 104 shown in FIG. 1 with respect to light from the spectral element 105' to the mirror array 106.

In the case of a wavelength selection optical switch having N inputs and one output (Add type), one of the input/output ports of the wavelength selection switch 200' shown in FIG. 2 may be an output port and the other input/output ports may be input ports. In the following description, the input/output ports are referred to as an output port 101c, an input port 101a, an input port 101b, an input port 101d, and an input port 101e.

Wavelength-multiplexed optical signals are emitted as diverging light from the input ports 101 through the waveguides 14 in the fiber array 140. For example, input light (two-dot chain line) emitted as diverging light from the input port 101b is incident on the lens array 102, is converted into parallel light, and is then incident on the first lens 103. The input light incident on the first lens 103 is converted into converging light, is focused on a first imaging point A, is changed to diverging light again, and is then incident on the second lens 104. The diverging light is converted into parallel light again and is then incident on the spectral element 105. The input light incident on the spectral element 105 is demultiplexed into light components for each wavelength. The demultiplexed light is incident on the third lens 104', is changed to converging light, and is then focused on the mirror array 106 for each wavelength. For example, a micromirror 106c is inclined at an angle θm required to make output light incident on the output port 101c, and output light (solid line) from the micromirror is incident as diverging light on the third lens 104'. The output light is converted into parallel light by the third lens 104', passes through the spectral element 105, and incident on the second lens 104. The light incident on the second lens 104 is converted into converging light and is then focused on the first imaging position A. The output light focused on the first imaging position A is incident as diverging light on the first lens 103, is converted into parallel light, and is then incident on the lens array 102. The light incident on the lens array 102 is converted into converging light, is coupled to the output port 101c, and is propagated through the fiber array 101.

The wavelength selection switch according to the related art includes two confocal optical systems. That is, the wavelength selection switch includes a confocal optical system I including the lens array 102 and the first lens 103 and a confocal optical system II provided in the rear stage of the confocal optical system I. In FIG. 1, the confocal optical system II includes the second lens 104 and the spectral element 105. In FIG. 2, the confocal optical system II includes the second lens, the spectral element 105, and the third lens 104'. When the focal length of the lens array 102 is fo and the focal length of the first lens 103 is f1, the image magnification M1 of the confocal optical system I is f1/fo. The image magnification is the absolute value of a lateral magnification. When the mode field diameter of the fiber is ωo, a beam spot size ω1 at the first imaging position A is represented by the following Expression 1:

$$\omega 1 = \omega o \cdot f1/fo. \qquad \text{[Expression 1]}$$

Light passes through the same lens in FIG. 1, and light passes through two lenses having the same lens characteristics in FIG. 2. Therefore, the image magnification of the confocal optical system II is 1 and the beam spot size at the first imaging position A is equal to that on the mirror array 106. That is, a beam spot size ωm on the mirror array 106 is represented by the following Expression 1':

$$\omega m = \omega o \cdot f1/fo. \qquad \text{[Expression 1']}$$

A beam size ωg on the spectral element 105 is represented by the following Expression 2 from Expression 1 and the following Gaussian beam equation:

$$\omega g = \lambda \cdot f2/(\pi \cdot \omega 1); \text{ and} \qquad \text{[Gaussian beam equation]}$$

$$\omega g = \lambda \cdot f2 \cdot fo/(\pi \cdot f1 \cdot \omega o) \qquad \text{[Expression 2]}$$

(where f2 indicates the focal length of each of the second lens 104 and the third lens 104').

Patent Documents

[Patent Document 1] Japanese Patent Application Laid-Open (JP-A) No. 2003-101479
[Patent Document 2] JP-A No. 2006-276216
[Patent Document 3] JP-A No. 2006-284740

In the wavelength selection switch, it is possible to reduce the focal length of each of the first lens 103 and the second lens 104 and thus reduce the size of the wavelength selection switch. Here, a reduction in the focal length is examined.

(Focal Length of First Lens 103)

Light is reflected at an angle of 2θm by the mirror array 106 with respect to the inclination angle θm of the micromirror 106c. The reflected light is incident on the second lens 104 in FIG. 1 and is incident on the third lens 104' in FIG. 2. The incident light is converted into collimated light. The collimated light is reflected from the spectral element 105 and is then incident on the second lens 104 again in FIG. 1. The collimated light passes through the spectral element 105 and is then incident on the second lens 104 in FIG. 2. Light passes through the same second lens 104 in FIG. 1, and the second lens 104 and the third lens 104' are the same lens and have the same focal length in FIG. 2. Therefore, light travels to the first imaging position A at an angle of 2θm. In addition, the incident angle of light on the first lens 103 is also 2θm. When light is incident on an adjacent port by the micromirror 106c inclined at the angle θm, the pitch Pf of the fiber array 140 and the lens array 102 is represented by the following Expression 3:

$Pf=\tan(2\theta m) \cdot f1.$ [Expression 3]

When the focal length f1 of the first lens 103 is reduced, the pitch Pf is reduced. However, the reduction in the pitch Pf of the fiber array 140 and the lens array 102 makes it difficult to manufacture the wavelength selection switch. In Expression 3, it is possible to reduce the focal length f1 while maintaining the pitch Pf by increasing the inclination angle θm of the micromirror. However, since there is a limit in the inclination angle θm, it is difficult to reduce the focal length f1 while maintaining the pitch Pf. Therefore, it is necessary to set the focal length f1 of the first lens 103 to a predetermined value or more.

(Focal Length of Second Lens 104)

FIG. 2(a) shows the wavelength selection switch 200' as viewed from the XZ plane. Input light (one-dot chain line) that is incident on the spectral element 105 at a predetermined angle is diffracted and multiplexed at a wavelength interval of dλ. Each of the multiplexed light components is incident on the third lens 104' at a predetermined diffraction angle and is then focused on the mirror array 106. In FIG. 2(a), output light is not shown. When the center wavelength is λo and the wavelength interval is dλ, adjacent wavelengths can be represented by λo+dλ and λo−dλ. When the difference between the diffraction angles of λo and λo−dλ is dβ and the focal length of the third lens 104' is f2, the pitch Pm of the micromirror 106c of the mirror array 106 can be represented by the following Expression 4:

$Pm=\tan(d\beta) \cdot f2.$ [Expression 4]

When the pitch Pm is reduced, the wavelength pass band characteristics of the wavelength selection switch deteriorate and the crosstalk between the ports increases. Therefore, it is difficult to reduce the pitch Pm of the micromirror 106c in terms of manufacture. For this reason, it is necessary to maintain the pitch Pm at a predetermined value or more. Therefore, it is necessary to increase the value of tan(dβ) in order to reduce the focal length f2 of the second lens 104.

The diffraction equation is represented as follows:

$g(\sin \alpha + \sin \beta) = m \cdot \lambda,$ [Diffraction lattice equation]

(where g indicates a lattice pitch, m indicates a diffraction order, α indicates an incident angle, and β indicates a diffraction angle).

Since $\beta=\arcsin(m \cdot \lambda/g - \sin \alpha)$ and $d\beta = m \cdot d\lambda/(g \cdot \cos \beta)$ are established from the diffraction equation, it is possible to reduce the lattice pitch g to increase a diffraction angle variation dβ.

However, it is difficult to reduce the lattice pitch g of the diffraction lattice in terms of manufacture, and a reduction in the lattice pitch causes a reduction in yield or an increase in manufacturing costs. Even when the lattice pitch g is reduced, the incident angle of light on the diffraction lattice and the diffraction angle of light are greatly inclined with respect to the normal line of the lattice plane to be close to the diffraction plane, from the relation of the diffraction lattice equation, which causes polarization dependence and a reduction in diffraction efficiency. Therefore, it is difficult to reduce the lattice pitch g to increase the diffraction angle β.

In addition, there is a method using a plurality of spectral elements. However, in the method, it is difficult to adjust the optical axis and polarization-dependent loss and insertion loss increase. Therefore, it is difficult to increase the diffraction angle β.

As such, since it is difficult to increase dβ or tan(dβ), it is difficult to reduce the focal length f2 of the second lens 104. As described above, since it is difficult to reduce the focal length f1 of the first lens 103 and the focal length f2 of the second lens 104, there has been a problem that it is difficult to reduce the size of a wavelength selection switch.

When the focal length f1 of the first lens 103 is reduced, the beam spot size at the first imaging position A and the mirror array 106 increases. Therefore, there has been also a problem that the area of the micromirror needs to increase, which results in an increase in the size of the mirror array 106, and it is difficult to reduce the size of a wavelength selection switch. And when the focal length f2 of the second lens 104 is reduced, the size of a beam emitted to the spectral element 105 decreases from Expression 2. When the beam size decreases, wavelength resolution is reduced. So there has been also a problem that it is difficult to reduce the size of a wavelength selection switch. Furthermore, when the focal length f2 of the second lens 104 is reduced without changing the beam spot size ω1 of the first imaging position A, linear dispersion on the mirror array 106 is reduced in proportion with the reduction in the focal length f2. Therefore, it is necessary to proportionally reduce the pitch of the mirror array 106 in order to maintain the interval between adjacent wavelengths. Meanwhile, the beam spot size ωm on the mirror array 106 is equal to the beam spot size ω1 at the first imaging position A. There has been a problem that the steepness of pass band characteristics and breaking characteristics deteriorates when the pitch of the mirror array 106 is reduced and it is difficult to reduce the size of a wavelength selection switch.

The disclosure has been made in view of the above-mentioned problems and an object of the disclosure is to provide a small wavelength selection switch.

SUMMARY

In order to achieve the object, a wavelength selection switch according to the disclosure includes an optical component for adjusting an optical path that reduces the focal lengths of a first lens and a second lens.

Specifically, a wavelength selection switch according to the disclosure includes: an input/output end in which a plurality of input ports to which input light having one or more wavelengths is input and at least one output port from which output light is output are arranged in a straight line so as to be parallel to each other; a lens array that is provided so as to face the input/output end, converts each input light component from the input ports into parallel light, and couples output light to the output port; a first lens that is provided so as to face the input/output end with the lens array interposed therebetween, converges each input light component from the lens array on a focus to be diffused, converts output light into parallel light, and couples the parallel light to the lens array; a second lens that is provided so as to face the lens array with the first lens interposed therebetween, converts each input light component from the first lens into parallel light, converges output light on a focus to be diffused, and couples the diffused light to the first lens; a spectral element that is provided so as to face the first lens with the second lens interposed therebetween, reflects and diffracts each input light component at different angles for each wavelength from a lattice plane obtained by forming a plurality of lattices in parallel to an arrangement direction of the input and output ports of the input/output end on a plane receiving the input light such that each input light component is coupled to the second lens again, and reflects and diffracts output light components at different angles for each wavelength, similar to the input light components, such that the output light components are coupled to the second lens; a mirror array that is provided so as to face the spectral element with the second lens interposed therebetween, deviates from a central axis connecting the first lens and the second lens, has micromirrors for each wavelength on which the input light that has been reflected from the spectral element and then focused for each wavelength by the second lens is incident for each wavelength and which are shared by the input light components for each wavelength, reflects light with a desired wavelength of the desired input light as output light such that the output light passes through the second lens, the spectral element, the second lens, the first lens, and the lens array in this order and is coupled to the output port; and an optical component for adjusting an optical path that is provided on an optical path common to input light from the second lens to the mirror array and output light from the mirror array to the second lens and reduces the focal lengths of the first lens and the second lens.

Another configuration of the wavelength selection switch according to the disclosure includes: an input/output end in which a plurality of input ports to which input light having one or more wavelengths is input and at least one output port from which output light is output are arranged in a straight line so as to be parallel to each other; a lens array that is provided so as to face the input/output end, converts each input light component from the input ports into parallel light, and couples output light to the output port; a first lens that is provided so as to face the input/output end with the lens array interposed therebetween, converges each input light component from the lens array on a focus to be diffused, converts output light into parallel light, and couples the parallel light to the lens array; a second lens that is provided so as to face the lens array with the first lens interposed therebetween, converts each input light component from the first lens into parallel light, converges output light on a focus to be diffused, and couples the diffused light to the first lens; a spectral element that is provided so as to face the first lens with the second lens interposed therebetween, transmits and diffracts input light components at different angles for each wavelength through a lattice plane obtained by forming a plurality of lattices in parallel to an arrangement direction of the input and output ports of the input/output end on a plane receiving the input light, and transmits and diffracts output light components at different angles for each wavelength, similar to the input light components, such that the output light components are coupled to the second lens; a third lens that is provided so as to face the second lens with the spectral element interposed therebetween, focuses input light components, which are separated for each wavelength, from the spectral element for each wavelength, converts output light into parallel light, and couples the parallel light to the spectral element; a mirror array that is provided so as to face the spectral element with the third lens interposed therebetween, has micromirrors for each wavelength on which the input light components focused by the third lens are incident for each wavelength and which are shared by the input light components, reflects light with a desired wavelength of the desired input light as output light such that the output light passes through the third lens, the spectral element, the second lens, the first lens, and the lens array in this order and is coupled to the output port; and an optical component for adjusting an optical path that is provided on an optical path common to input light from the third lens to the mirror array and output light from the mirror array to the third lens and reduces the focal lengths of the first lens and the second lens.

Since the optical component for adjusting an optical path with an image magnification of M is arranged between the second lens or the third lens and the mirror array, it is possible to reduce the focal length of each of the first lens and the second lens to 1/M while maintaining the pitches of the spectral element, the fiber array, and the mirror array. Therefore, it is possible to reduce the optical path length and provide a small wavelength selection optical switch. Furthermore, since the optical path length is reduced, it is possible to reduce the number of reflecting mirrors used to convert an optical path and thus reduce the size of a housing. Therefore, it is possible to reduce manufacturing costs.

The optical component for adjusting an optical path of the wavelength selection switch according to the disclosure includes the first lens for adjusting an optical path and the second lens for adjusting an optical path arranged in this order from the input light incident side, and the first lens for adjusting an optical path and the second lens for adjusting an optical path form the confocal optical system. Therefore, it is possible to adjust the image magnification M with the focal lengths of two lenses.

In the wavelength selection switch according to the disclosure, the focal length of the second lens for adjusting an optical path is longer than that of the first lens for adjusting an optical path. Therefore, it is possible to set the image magnification M to be greater than 1 (M>1). In addition, the first lens for adjusting an optical path may be a convex lens or a concave lens.

When the input port is provided at the center of the input/output end and the output ports are provided on both sides of the input port, the distance Pn from the input port to the outermost output port is represented by the following Expression 4':

$$Pn = \tan(2\theta m) \cdot f1. \qquad \text{[Expression 4']}$$

Since n output ports are arranged at predetermined intervals from the input port that is disposed in the vicinity of the center, it is necessary to increase the maximum inclination angle of the micromirrors in the mirror array or increase the focal length of the first lens in order to increase the number of output ports, as can be seen from Expression 4'. However, there is a limit in the inclination angle of the micromirror. In addition, when the focal length of the first lens increases, the size of the wavelength selection switch increases. It is possible to reduce the pitch between the ports to increase the number of output ports. However, in this case, it is difficult to reduce the pitch of the fiber array and the lens array, and a reduction in yield or an increase in costs is also considered. Therefore, there has been also a problem that it is difficult to increase the number of output ports in a small wavelength selection switch.

In the wavelength selection switch according to the disclosure, the focal length of the first lens whose image magnification is reduced to 1/M by the insertion of the optical component for adjusting an optical path with an image magnification of M returns to the original value and the focal length of the lens array increases M times (where M>1).

In general, the focal length of each of the lens array and the first lens is much shorter than that of the second lens. Therefore, even when the focal length of the lens array increases M times, it is possible to reduce the size of a wavelength selection switch by reducing the focal length of the second lens to 1/M. Even when the focal length of the first lens that has been reduced to 1/M returns to the original value, it is possible to reduce the size of a wavelength selection switch by reducing the focal length of the second lens to 1/M. Therefore, the disclosure can provide a small wavelength selection switch with a large number of output ports.

Effects of the Disclosure

The disclosure can provide a small wavelength selection switch at a low cost.

BRIEF DESCRIPTION OF THE DRAWINGS

FIG. 2 is a diagram schematically illustrating the structure of the wavelength selection switch according to the related art. FIG. 2(a) is a diagram schematically illustrating the structure of the wavelength selection switch in the x-z plane and FIG. 2(b) is a diagram schematically illustrating the structure of the wavelength selection switch in the y-z plane.

FIG. 3 is a diagram schematically illustrating the structure of a wavelength selection switch according to the disclosure. FIG. 3(a) is a diagram schematically illustrating the structure of the wavelength selection switch in the x-z plane and FIG. 3(b) is a diagram schematically illustrating the structure of the wavelength selection switch in the y-z plane.

FIG. 4 is a diagram schematically illustrating the structure of a wavelength selection switch according to the disclosure. FIG. 4(a) is a diagram schematically illustrating the structure of the wavelength selection switch in the x-z plane and FIG. 4(b) is a diagram schematically illustrating the structure of the wavelength selection switch in the y-z plane.

FIG. 5 is a diagram schematically illustrating the structure of a wavelength selection switch according to the disclosure. FIG. 5(a) is a diagram schematically illustrating the structure of the wavelength selection switch in the x-z plane and FIG. 5(b) is a diagram schematically illustrating the structure of the wavelength selection switch in the y-z plane.

FIG. 6 is a diagram schematically illustrating the structure of a wavelength selection switch according to the disclosure.

DETAILED DESCRIPTION OF THE PREFERRED EMBODIMENT

Figure 1:
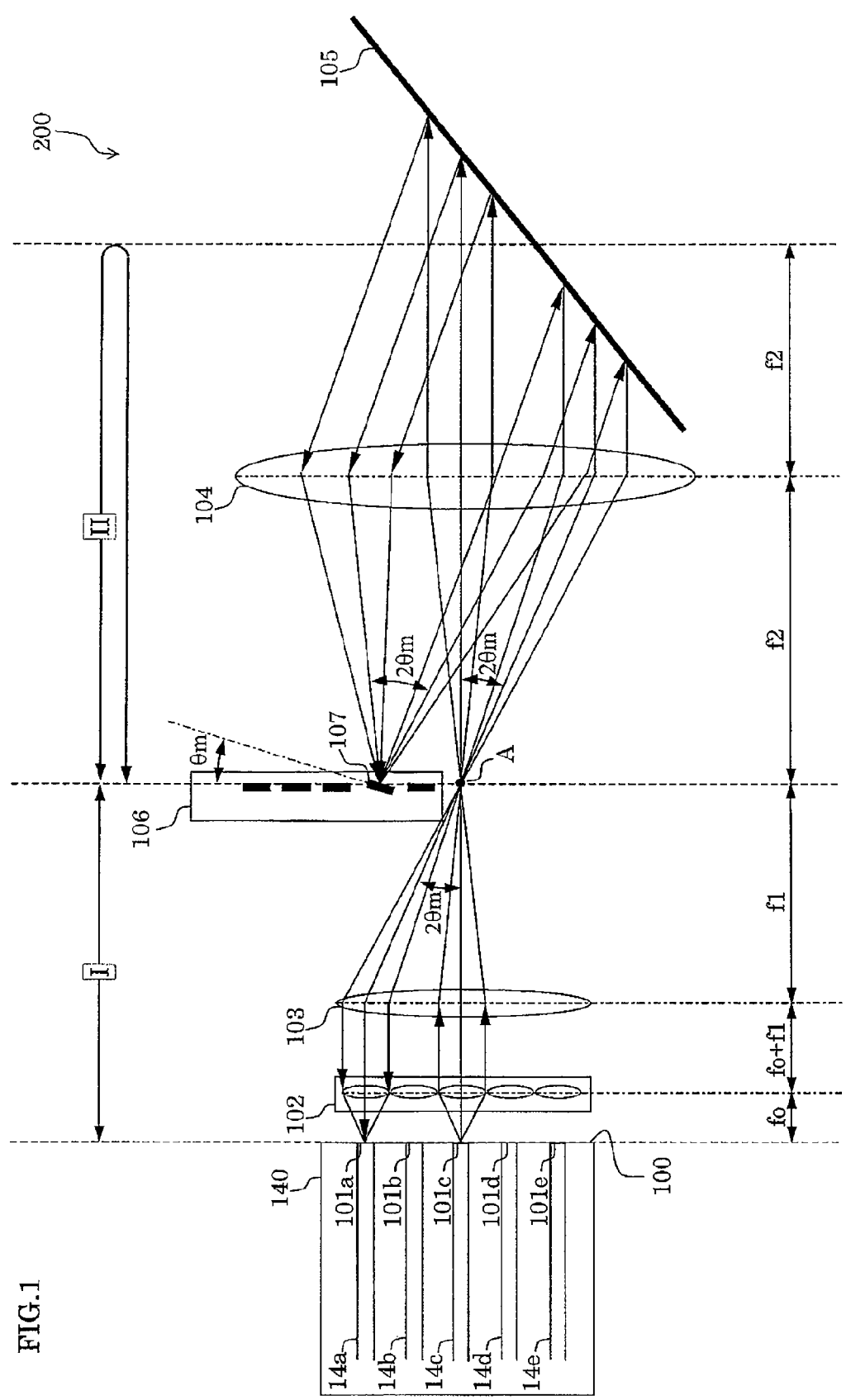
FIG. 1 is a diagram schematically illustrating the structure of a wavelength selection switch according to the related art.

Hereinafter, exemplary embodiments of the disclosure will be described in detail, but the disclosure is not limited to the following description. In the specification and the drawings, the same components are denoted by the same reference numerals.

First Embodiment

FIG. 3 is a diagram schematically illustrating the structure of a wavelength selection switch 301 according to a first embodiment. FIG. 3(a) shows the wavelength selection switch 301 in the x-z plane and FIG. 3(b) shows the wavelength selection switch 301 in the y-z plane. And in the following description, input/output ports 11 indicate all input/output ports (in FIGS. 3 and 4, input/output ports 11a to 11c) at an input/output end 10. And waveguides 14 indicate all waveguides (in FIGS. 3 and 4, waveguides 14a to 14c) in a fiber array 140. Furthermore, in this embodiment, among the input/output ports 11, the input/output ports 11a and 11c are referred to as input ports to which input light is input, and the input/output port 11b is referred to as an output port from which output light is output.

The wavelength selection switch 301 has a reflective structure, that is, a structure in which a spectral element 60 reflects and diffracts light. The wavelength selection switch 301 includes: an input/output end 10 in which a plurality of input/output ports 11a and 11c to which input light having one or more wavelengths is input and at least one input/output port 11b from which output light is output are arranged in a straight line so as to be parallel to each other; a lens array 20 that is provided so as to face the input/output end 10, converts each input light component from the input/output ports 11a and 11c into parallel light, and couples output light to the input/output port 11b; a first lens 30 that is provided so as to face the input/output end 10 with the lens array 20 interposed therebetween, converges each input light component from the lens array 20 on a focus to be diffused, converts output light into parallel light, and couples the parallel light to the lens array 20; a second lens 50 that is provided so as to face the lens array 20 with the first lens 30 interposed therebetween, converts each input light component from the first lens 30 into parallel light, converges output light on a focus to be diffused, and couples the diffused light to the first lens 30; a spectral element 60 that is provided so as to face the first lens 30 with the second lens 50 interposed therebetween, reflects and diffracts each input light component at different angles for each wavelength from a lattice plane 62 obtained by forming a plurality of lattices in parallel to the arrangement direction of the input/output ports 11 of the input/output end 10 on a plane receiving the input light such that each input light component is coupled to the second lens 50 again, and reflects and diffracts output light components at different angles for each wavelength, similar to the input light components, such that the output light components are coupled to the second lens 50; a mirror array 80 that is provided so as to face the spectral element 60 with the second lens 50 interposed therebetween, deviates from a central axis connecting the first lens 30 and the second lens 50, has micromirrors for each wavelength on which the input light that has been reflected from the spectral element 60 and then focused for each wavelength by the second lens 50 is incident for each wavelength and which are shared by the input light components for each wavelength, and reflects light with a desired wavelength of the desired input light as output light such that the output light passes through the second lens 50, the spectral element 60, the second lens 50, the first lens 30, and the lens array 20 in this order and is coupled to the input/output port 11*b*; and an optical component 90 for adjusting an optical path that is provided on an optical path common to input light from the second lens 50 to the mirror array 80 and output light from the mirror array 80 to the second lens 50 and reduces the focal lengths of the first lens 30 and the second lens 50.

The input/output end 10 is the end surface of the fiber array 140 in which the input/output ports 11 are provided. FIG. 3 shows two input/output ports 11*a* and 11*c* to which input light is input, but any number of input/output ports more or less than 2 may be provided. Similarly, the number of input/output ports 11*b* is not limited to one, but it may be two or more. For example, the waveguides 14*a* to 14*c* are respectively connected to the input/output ports 11. Light including one or more wavelengths propagated through the waveguides 14 is input to the input/output ports 11*a* to 11*c*. The input/output port 11*b* outputs light to the waveguide 14*b*. The input/output port 11*b* is provided in a straight line to be parallel.

For example, a microlens array is used as the lens array 20.

For example, a convex lens, a doublet lens formed by bonding and combining a convex lens and a concave lens suitable to reduce optical aberration, and a lens, such as a triplet lens, formed by combining a plurality of lenses are used as the first lens 30 and the second lens 50.

The spectral element 60 is, for example, a reflective diffraction lattice. The spectral element 60 includes a lattice plane 62 on which a plurality of lattices arranged in the y-axis direction is formed in parallel to the x-axis direction. For example, the lattice plane 62 may be a plurality of concave and convex grooves or an array in which light reflecting portions and light absorbing portions are alternately arranged. In this way, as shown in FIG. 3(*a*), light passing through the second lens 50 is reflected and diffracted by the spectral element 60. That is, the light is reflected from the lattice plane 62 of the spectral element 60 at different diffraction angles for each wavelength in the xz plane. The light is reflected in the z-axis direction without any change. In FIG. 3, for simplicity of illustration, the lattice plane 62 of the spectral element 60 directly faces the second lens 50. However, in general, the lattice plane 62 is inclined with respect to the optical axis (z-axis) such that the normal line of the lattice plane 62 is in the xz plane.

The mirror array 80 includes micromirrors 80*a* to 80*c*. A plurality of micromirrors may be provided for each wavelength according to the number of wavelengths included in input light. In the mirror array 80, the inclination angle θm of each micromirror may be changed. For example, a MEMS (Micro Electro Mechanical Systems) mirror may be used as the micromirror. The micromirrors 80*a* to 80*c* are arranged at a mirror pitch Pm in the X direction.

A confocal optical system I including the lens array 20 and the first lens 30 is formed from the input/output end 10 to a first imaging position A. In addition, a confocal optical system II including the second lens 50 and the spectral element 60 is formed from the first imaging position A to a second imaging position B.

The optical component 90 for adjusting an optical path is provided on an optical path common to input light from the second lens 50 to the mirror array 80 and output light from the mirror array 80 to the second lens 50. The image magnification M of the optical component 90 for adjusting an optical path is equal to or more than 1 with respect to input light. In addition, the optical component 90 for adjusting an optical path includes a first lens 91 for adjusting an optical path and a second lens 92 for adjusting an optical path arranged in this order from the input light incident side. A confocal optical system III including the first lens 91 for adjusting an optical path and the second lens 92 for adjusting an optical path is formed from the second imaging position B to the mirror array 80.

Next, the operation of the wavelength selection switch 301 will be described with reference to FIGS. 3(*a*) and 3(*b*). Input light is represented by a one-dot chain line and output light is represented by a solid line. In FIG. 3(*a*), the output light is not shown. In FIG. 3(*b*), input light from the mirror array 80 to the spectral element 60 is represented by a dashed line and output light is represented by a dotted line. Wavelength-multiplexed light propagated through the waveguide 14 is emitted as input light from the input/output port 11*a*, and the input light is converted into parallel light by the lens array 20. The parallel light is focused on the first imaging position A by the first lens 30 and is then changed to diverging light. The diverging light is incident on the second lens 50 and is then converted into parallel light again. Then, the parallel light is incident on the spectral element 60. Each input light component is diffracted and reflected by the spectral element 60. That is, the light components are reflected and diffracted from the lattice plane 62 of the spectral element 60 at different angles for each wavelength in the xz plane. In FIG. 3(*a*), light components that are branched for each wavelength by the spectral element 60 are represented by a dotted line, a one-dot chain line, and a long dashed line. The light components that are reflected and diffracted by the spectral element 60 to be branched for each predetermined wavelength are focused on the second imaging position B by the second lens 50.

The input light passing through the second imaging position B is changed to diffused light again, is incident on the first lens 91 for adjusting an optical path, and is then converted into parallel light. The parallel light is incident on the second lens 92 for adjusting an optical path. In this case, the optical path of a short wavelength and the optical path of a long wavelength are reversed in the x-axis direction. In addition, the incident light is converted into converging light by the second lens 92 for adjusting an optical path and is then focused on the micromirrors 80*a* to 80*c* that are arranged at predetermined pitches in the X direction of the mirror array 80.

That is, each input light component from the input/output ports 11 is dispersed for each wavelength by the spectral element 60 and the dispersed light components are incident on the micromirrors 80*a* to 80*c*, respectively. For example, when input light is wavelength-multiplexed light including three wavelengths (λ1, λ2, and λ3), a light component with the wavelength λ1 among the input light components from the input/output port 11*a* is incident on the micromirror 80*a*, a light component with the wavelength λ2 is incident on the micromirror 80*b*, and a light component with the wavelength λ3 is incident on the micromirror 80*c*.

The inclination angle θm of the micromirrors 80*a* to 80*c* are changed such that the reflected light components with some wavelengths are coupled to the input/output port 11*b*, thereby adjusting the direction of the reflected light. The angle (2θm) of the reflected light is twice the inclination angle θm of the micromirrors 80*a* to 80*c*. The reflected light is changed to diffused light and is incident on the second lens 92 for adjusting an optical path again to be converted into parallel light. Then, the parallel light is incident on the first lens 91 for adjusting an optical path. Here, the optical path of a short wavelength and the optical path of a long wavelength are reversed in the x-axis direction again, and the parallel light is changed to converging light and is then focused on the second imaging position B. The reflected light focused on the second imaging position B is changed to diffused light and is then incident on the second lens 50. The incident light is converted into parallel light by the second lens 50 and is incident on the spectral element 60. The incident light is reflected and diffracted by the spectral element 60 and is then multiplexed. The multiplexed light is incident on the second lens 50, is changed to converging light, and is then focused on the first imaging position A. An optical signal of the light focused on the first imaging position A is changed to diffused light again and is then incident on the first lens 30. The incident light is converted into parallel light by the first lens 30 and is incident on the lens array 20 corresponding to the input/output port 11*b*. The incident light is focused on the input/output end 10 by the lens array 20 and is then propagated through the waveguide 14*b*.

(Focal Lengths of First Lens and Second Lens)

When the optical component 90 for adjusting an optical path includes the first lens 91 for adjusting an optical path and the second lens 92 for adjusting an optical path, the image magnification M of the optical component 90 for adjusting an optical path is represented by the following Expression 5:

$$M = f4/f3 \quad \text{[Expression 5]}$$

(where f3 indicates the focal length of the first lens 91 for adjusting an optical path and f4 indicates the focal length of the second lens 92 for adjusting an optical path).

The focal length of the second lens 92 for adjusting an optical path is longer than the focal length of the first lens 91 for adjusting an optical path such that the image magnification M satisfies M>1. That is, it is necessary to select the first lens 91 for adjusting an optical path and the second lens 92 for adjusting an optical path such that relationship f4>f3 is satisfied. When the optical component 90 for adjusting an optical path with the image magnification M is arranged between the confocal optical system II and the mirror array 80, it is possible to reduce each of the focal length f1 of the first lens 30 and the focal length f2 of the second lens 50 to 1/M. That is, since the first lens focal length is f1/M and the second lens focal length is f2/M, it is possible to reduce the size of the wavelength selection switch 301.

(Size of Beam Spot on Mirror Array)

When the focal length of the lens array 20 in the confocal optical system I is fo and the focal length of the first lens is f1/M, the image magnification M1 of the confocal optical system I satisfies the relationship M1=f1/(M·fo). When the mode field diameter of the fiber is ωo, a beam spot size ω1 at the first imaging position A is represented by the following Expression 6:

$$\omega 1 = \omega o \cdot f1/(M \cdot fo). \quad \text{[Expression 6]}$$

Since the confocal optical system II passes through the same lens, the image magnification is 1. Therefore, a beam spot size ω2 at the second imaging position B is equal to the beam spot size ω1 at the first imaging position A. Next, since a beam spot size ωm on the mirror array is magnified M times by the optical component 90 for adjusting an optical path, the beam spot size ωm is represented by the following Expression 7:

$$\omega m = M \cdot \omega o \cdot f1/(M \cdot fo) = \omega o \cdot f1/fo. \quad \text{[Expression 7]}$$

Expression 7 is the same as Expression 1' according to the related art. Even when the optical component 90 for adjusting an optical path with the image magnification M is arranged between the confocal optical system II and the mirror array 80 to reduce the focal lengths of the first lens 30 and the second lens 50 to 1/M, the beam spot size on the mirror array 80 is not changed and it is not necessary to increase the sizes of the micromirrors 80*a* to 80*c*. Therefore, the use of the optical component 90 for adjusting an optical path makes it possible to reduce the focal lengths of the first lens 30 and the second lens 50 while maintaining the size of the mirror array 80. As a result, it is possible to reduce the size of the wavelength selection switch 301.

(Beam Spot Size on Spectral Element)

The beam spot size at the first imaging position A is represented by Expression 6, and a beam size ωg on the spectral element is represented by the following Expression 8 by the above-mentioned Gaussian beam equation:

$$\omega g = \lambda \cdot fo \cdot M \cdot f2/(\pi \cdot f1 \cdot \omega o \cdot M)$$

$$= \lambda \cdot fo \cdot f2/(\pi \cdot f1 \cdot \omega o). \quad \text{[Expression 8]}$$

Expression 8 is the same as Expression 2 according to the related art. Even when the optical component 90 for adjusting an optical path with the image magnification M is arranged between the confocal optical system II and the mirror array 80, the beam spot size on the spectral element 60 is not changed and wavelength resolution is not changed. Therefore, the use of the optical component 90 for adjusting an optical path makes it possible to reduce the focal lengths of the first lens 30 and the second lens 50 while maintaining the wavelength resolution. As a result, it is possible to reduce the size of the wavelength selection switch 301.

(Pitch of Fiber Array and Lens Array)

As shown in FIG. 3(*b*), the inclination angle of the micromirrors of the mirror array 80 when the port outputting reflected light is switched is θm. The optical axis of reflected light is inclined at an angle of 2θm with respect to the optical axis of incident light. The reflected light is converted into collimated light by the second lens 92 for adjusting an optical path. When the distance from the optical axis of incident light to the optical axis of reflected light in the Y-axis direction in the second lens 92 for adjusting an optical path is dY and the focal length of the second lens 92 for adjusting an optical path is f4, the distance dY in the Y-axis direction is represented by the following Expression 9:

$$dY = \tan(2\theta m) \cdot f4. \quad \text{[Expression 9]}$$

In addition, the beam field angle θ1 of the first lens 30 and the pitch Pf of the fiber array 140 and the lens array 20 are represented by the following Expression 10:

$$Pf = \tan \theta 1 \cdot (f1/M); \text{ and}$$

$$\theta 1 = \arctan(Pf \cdot M/f1). \quad \text{[Expression 10]}$$

Since the beam field angle θ1, the beam field angle θ2 of the second lens 50, the beam field angle θ2' of the third lens 70, and the beam field angle θ3 of the first lens 91 for adjusting an optical path are the corresponding angles, Expression 10 is rearranged as follows:

$$\theta 3 = \arctan(Pf \cdot M/f1). \quad \text{[Expression 10']}$$

Furthermore, when the focal length of the first lens 91 for adjusting an optical path is f3, the distance dY is represented by the following Expression 11:

$$dY = \tan\{\arctan(Pf \cdot M/f1)\} \cdot f3. \quad \text{[Expression 11]}$$

The following Expression 12 is obtained by Expression 9 and Expression 11:

$$\tan\{\arctan(Pf \cdot M/f1)\} \cdot f3 = \tan(2\theta m) \cdot f4,$$

$$Pf = \tan(2\theta m) \cdot f1 \cdot f4/(f3 \cdot M). \quad \text{[Expression 12]}$$

When Expression 5 is substituted into Expression 12, the pitch Pf is represented by the following Expression 13:

$$Pf=\tan(2\theta m)\cdot f1.\quad\text{[Expression 13]}$$

Expression 13 is the same as Expression 3 according to the related art. Even when the third confocal optical system with the image magnification M is arranged between the second confocal optical system and the mirror array, the pitch Pf of the fiber array 140 and the lens array 20 is not changed. Therefore, the use of the optical component 90 for adjusting an optical path makes it possible to reduce the focal lengths of the first lens 30 and the second lens 50 while maintaining the sizes of the fiber array 140 and the lens array 20. As a result, it is possible to reduce the size of the wavelength selection switch 301.

(Pitch of Mirror Array)

As shown in FIG. 3($a$), input light incident on the spectral element 60 at a predetermined angle is diffracted and branched into light components at a wavelength interval of d$\lambda$ at predetermined diffraction angles. The branched light is incident on the second lens 50 and is then focused on the second imaging position B. The second imaging position B is a real image position where light is incident on the mirror array 80 by the confocal optical system III.

When the center wavelength of the branched input light components is $\lambda o$ and the wavelength interval therebetween is d$\lambda$, adjacent wavelengths can be represented by $\lambda o+d\lambda$ and $\lambda o-d\lambda$. In FIG. 3($a$), an input light component with the center wavelength $\lambda o$ is represented by a one-dot chain line and input light components with the adjacent wavelength $\lambda o+d\lambda$ and the adjacent wavelength $\lambda o-d\lambda$ are represented by a dotted line and a long dashed line, respectively. For example, when the difference between the diffraction angles of the input light component with the center wavelength $\lambda o$ and the input light component with the adjacent wavelength $\lambda o-d\lambda$ is d$\beta$, a pitch Pm' of the mirror array 80' of the real image can be represented by the following Expression 14:

$$Pm'=\tan(d\beta)\cdot f2/M.\quad\text{[Expression 14]}$$

Since the pitch Pm of the mirror arrays 80 is converted M times by the confocal optical system III, the pitch Pm is represented by the following Expression 15:

$$Pm=M\cdot Pm'=\tan(d\beta)\cdot f2.\quad\text{[Expression 15]}$$

Expression 15 is the same as Expression 4 according to the related art. Even when the optical component 90 for adjusting an optical path with the image magnification M is arranged between the confocal optical system II and the mirror array 80 to reduce the focal lengths of the first lens 30 and the second lens 50 to 1/M, the pitch Pm required for the mirror array 80 is not changed. Therefore, the use of the optical component 90 for adjusting an optical path makes it possible to reduce the focal lengths of the first lens 30 and the second lens 50 without reducing the pitch Pm of the mirror array 80. As a result, it is possible to reduce the size of the wavelength selection switch 301.

As described above, when the optical component 90 for adjusting an optical path with the image magnification M is arranged between the second imaging position B and the mirror array 80, it is possible to reduce the focal lengths of the first lens 30 and the second lens 50 to 1/M and provide the small wavelength selection optical switch 301 with a short optical path length. In addition, since the optical path length is reduced, it is possible to reduce the number of mirror components for converting an optical path, which are required to be mounted in a predetermined housing, and thus reduce the size of the housing. Therefore, it is possible to reduce the costs of members. In addition, it is possible to reduce the size of the device without reducing the pitch of the spectral element, the fiber array, the lens array, and the mirror array used in the related art. Therefore, it is possible to reduce manufacturing costs. Furthermore, since the optical path length is reduced, it is possible to reduce the number of reflecting mirrors used to convert an optical path and thus reduce the size of the housing. Therefore, it is possible to reduce manufacturing costs.

Second Embodiment

FIG. 4 is a diagram schematically illustrating the structure of a wavelength selection switch 302 according to a second embodiment. FIG. 4($a$) shows the wavelength selection switch 302 in the x-z plane and FIG. 4($b$) shows the wavelength selection switch 302 in the y-z plane. In FIG. 4, the same components as those shown in FIG. 3 are denoted by the same reference numerals and a description thereof will be omitted. In this embodiment, among input/output ports 11, input/output ports 11$a$ and 11$c$ are referred to as input ports to which input light is input, and an input/output port 11$b$ is referred to as an output port from which output light is output.

The wavelength selection switch 302 has a transmissive structure, that is, a structure in which a spectral element 65 transmits and diffracts light. The wavelength selection switch 302 according to the second embodiment includes: an input/output end 10 in which a plurality of input/output ports 11$a$ and 11$c$ to which input light having one or more wavelengths is input and at least one input/output port 11$b$ from which output light is output are arranged in a straight line so as to be parallel to each other; a lens array 20 that is provided so as to face the input/output end 10, converts each input light component from the input/output ports 11$a$ and 11$c$ into parallel light, and couples output light to the input/output port 11$b$; a first lens 30 that is provided so as to face the input/output end 10 with the lens array 20 interposed therebetween, converges each input light component from the lens array 20 on a focus to be diffused, converts output light into parallel light, and couples the parallel light to the lens array 20; a second lens 50 that is provided so as to face the lens array 20 with the first lens 30 interposed therebetween, converts each input light component from the first lens 30 into parallel light, converges output light on a focus to be diffused, and couples the diffused light to the first lens 30; the spectral element 65 that is provided so as to face the first lens 30 with the second lens 50 interposed therebetween, transmits and diffracts each input light component at different angles for each wavelength through a lattice plane 67 obtained by forming a plurality of lattices in parallel to the arrangement direction of the input/output ports 11 of the input/output end 10 on a plane receiving the input light, and transmits and diffracts output light components at different angles for each wavelength, similar to the input light components, such that the output light components are coupled to the second lens 50; a third lens 70 that is provided so as to face the second lens 50 with the spectral element 65 interposed therebetween, focuses input light components, which are separated for each wavelength, from the spectral element 65 for each wavelength, converts output light to parallel light, and couples the parallel light to the spectral element 65; a mirror array 80 that is provided so as to face the spectral element 65 with the third lens 70 interposed therebetween, has micromirrors for each wavelength on which the input light components focused by the third lens 70 are incident for each wavelength and which are shared by the input light components, reflects light with a desired wavelength of the desired input light as output light such that the output light passes through the third lens 70, the spectral element 65, the second lens 50, the first lens 30, and the lens array 20 in this order and is coupled to the input/output port 11b; and an optical component 90 for adjusting an optical path that is provided on an optical path common to input light from the third lens 70 to the mirror array 80 and output light from the mirror array 80 to the third lens 70 and reduces the focal lengths of the first lens 30 and the second lens 50.

The spectral element 65 is, for example, a transmissive diffraction lattice. The lattice plane 67 of the spectral element 65 is the same as the lattice plane 62 shown in FIG. 3. Therefore, as shown in FIG. 4(a), the spectral element 65 transmits and diffracts the input light passing through the second lens 50. That is, the input light is emitted from the lattice plane 67 of the spectral element 65 at different diffraction angles for each wavelength in the xz plane.

In the wavelength selection switch 302, the second lens 50 and the third lens 70 form a confocal optical system II. The third lens 70 has the same characteristics as the second lens 50 and the distance between the third lens 70 and the spectral element 65 is equal to the distance between the second lens 50 and the spectral element 65.

Next, the operation of the wavelength selection switch 302 will be described with reference to FIGS. 4(a) and 4(b). Input light is represented by a one-dot chain line and output light is represented by a solid line. In FIG. 4(a), the output light is not shown. The operation of the wavelength selection switch 302 until the input light is incident on the spectral element 65 and until the output light is coupled to the input/output port 11b is the same as that of the wavelength selection switch 301 shown in FIG. 3. Each input light component passes through the lattice plane 67 of the spectral element 65, is diffracted at different angles for each wavelength in the xz plane, and is then branched at a predetermined wavelength interval. Each of the branched light components is focused by the third lens 70 and is then incident on micromirrors 80a to 80c of the mirror array 80 for each wavelength through the optical component 90 for adjusting an optical path.

The operation of the mirror array 80 and the function of the optical component 90 for adjusting an optical path are the same as those in the wavelength selection switch 301 shown in FIG. 3. Therefore, as described in the wavelength selection switch 301 shown in FIG. 3, when the optical component 90 for adjusting an optical path with an image magnification of M is arranged between the second imaging position B and the mirror array 80, it is possible to reduce the focal lengths of the first lens 30 and the second lens 50 to 1/M and provide the small wavelength selection optical switch 302 with a short optical path length. In addition, it is possible to reduce manufacturing costs, similar to the wavelength selection switch 301 shown in FIG. 3.

Third Embodiment

FIG. 5 is a diagram schematically illustrating the structure of a wavelength selection switch 303 according to a third embodiment. The wavelength selection switch 303 differs from the wavelength selection switch 302 shown in FIG. 4 in that a first lens 96 for adjusting an optical path is used instead of the first lens 91 for adjusting an optical path. Therefore, a detailed description of the overall structure and operation of the wavelength selection switch 303 will be omitted, and only the structure and operation of the optical component 90 for adjusting an optical path will be described below.

The first lens 91 for adjusting an optical path shown in FIG. 4 is a convex lens, but the first lens 96 for adjusting an optical path shown in FIG. 5 is a concave lens. A second lens 92 for adjusting an optical path is a convex lens, similar to the second embodiment shown in FIG. 4. The image magnification of the optical component 90 for adjusting an optical path is represented by the following Expression 16:

$$M = f4/|f3|$$ [Expression 16]

(where f3 indicates the focal length (a negative value since the lens is a concave lens) of the first lens 96 for adjusting an optical path and f4 indicates the focal length of the second lens 92 for adjusting an optical path).

The focal length of the second lens 92 for adjusting an optical path is greater than the absolute value of the focal length of the first lens 96 for adjusting an optical path such that the image magnification M satisfies the relationship M>1. That is, it is necessary to select the first lens 96 for adjusting an optical path and the second lens 92 for adjusting an optical path such that f4>|f3| is satisfied. The first lens 96 for adjusting an optical path is arranged between the second imaging point B and the third lens 70 at a position that is away from the second imaging point B by the absolute value of the focal length f3 of the first lens 96 for adjusting an optical path. In addition, the second lens 92 for adjusting an optical path is arranged between the first lens 96 for adjusting an optical path and the mirror array 80 at a position that is f4−|f3| away from the first lens 96 for adjusting an optical path. In this way, an erected image that is M times more than that at the second imaging point B is formed on the mirror array 80.

In the wavelength selection switch 302 shown in FIG. 4, an inverted image that is M times more than that at the second imaging point B is formed on the mirror array 80, but the overall operation of the wavelength selection switch 303 is the same as that of the wavelength selection switch 302 except for this point.

Example

The wavelength selection switch 302 according to the second embodiment is compared with the wavelength selection switch according to the related art. In the wavelength selection optical switch according to the related art, when the focal length fo of the lens array is 1 mm, the focal length f1 of the first lens is 10 mm, and the focal length f2 of the second lens is 150 mm, the optical path length L from the incident/emission end of the fiber array to the mirror array is 622 mm. In contrast, in the wavelength selection optical switch 302, when the focal length f3 of the first lens 91 for adjusting an optical path in the confocal optical system III is 5 mm and the focal length f4 of the second lens 92 for adjusting an optical path is 10 mm, that is, when the image magnification M is 2, the focal lengths of the first lens 30 and the second lens 50 are reduced by half. Therefore, the focal length f1' of the first lens 30 is 5 mm and the focal length f2' of the second lens 50 is 75 mm. The optical path length L' from the input/output end 10 of the fiber array 140 to the mirror array 80 is 342 mm. Therefore, it is possible to reduce the optical path length by 45% and thus reduce the size of the wavelength selection optical switch.

Fourth Embodiment

Figures 6A, 6B:
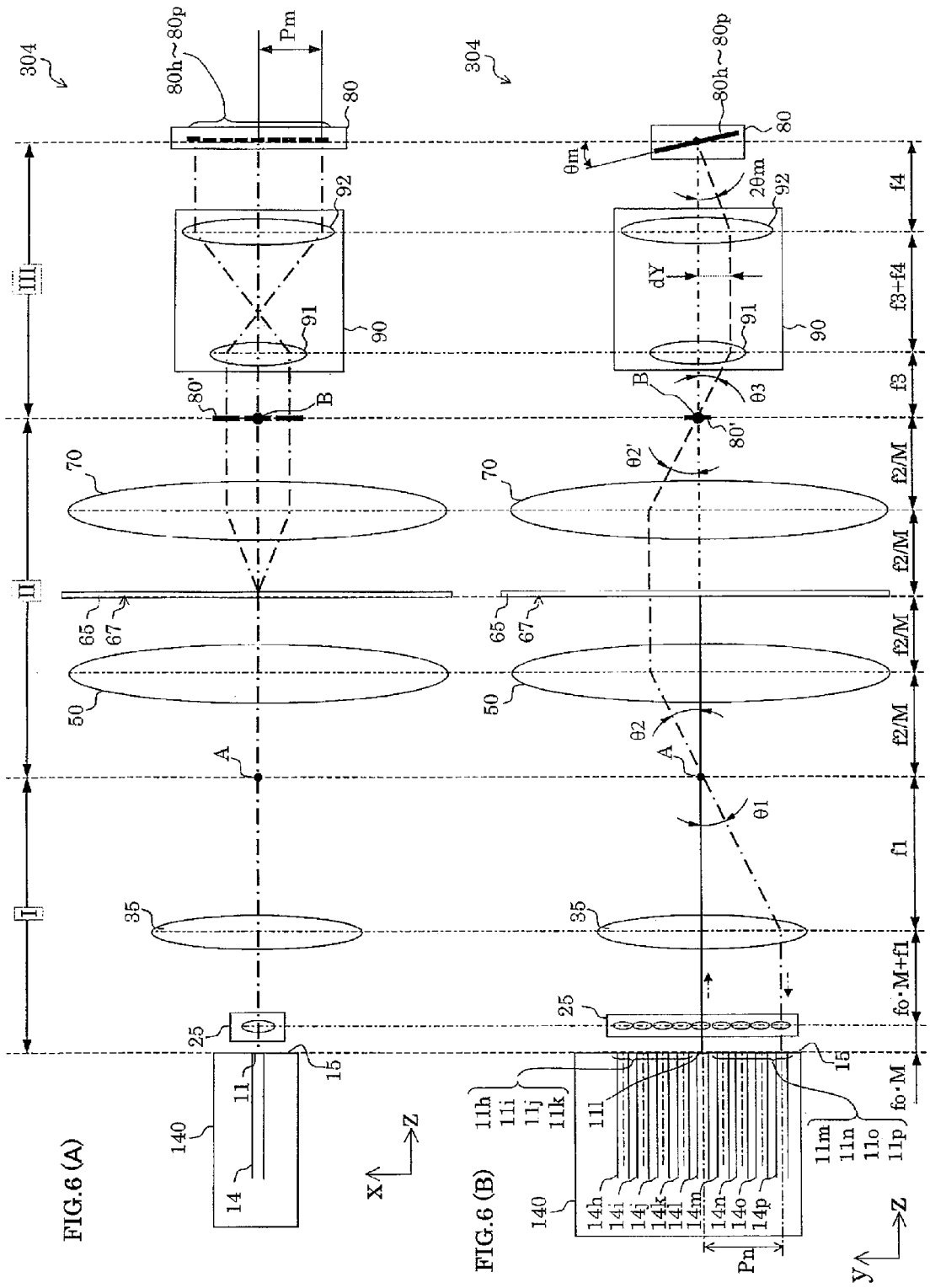
FIG. 6(a) is a diagram schematically illustrating the structure of the wavelength selection switch in the x-z plane and FIG. 6(b) is a diagram schematically illustrating the structure of the wavelength selection switch in the y-z plane.

FIG. 6 is a diagram schematically illustrating the structure of a wavelength selection switch 304 according to a fourth embodiment. FIG. 6(a) shows the wavelength selection switch 304 in the x-z plane and FIG. 6(b) shows the wavelength selection switch 304 in the y-z plane. In FIG. 6, the same components as those shown in FIGS. 3 and 4 are denoted by the same reference numerals and a description thereof will be omitted. The wavelength selection switch 304 differs from the wavelength selection switch 302 shown in FIG. 4 in that the wavelength selection switch 304 includes an input/output end 15, a lens array 25, and a first lens 35, instead of the input/output end 10, the lens array 20, and the first lens 30.

The number of input/output ports provided in the input/output end 15 is more than that provided in the input/output end 10. Specifically, the input/output end 15 includes an input port 11*l* provided at the center and output ports (11*h* to 11*k*) and output ports (11*m* to 11*p*) provided on both sides of the input port 11*l*. Therefore, the number of lenses in the lens array 25 is also more than that in the lens array 20. The focal length of the lens array 25 is M times longer than the focal length of the lens array 20, that is, fo·M.

The diameter of the first lens 35 is greater than that of the first lens 30 for coupling output light to the output ports (11*h* to 11*k* and 11*m* to 11*p*) with a large width. The focal length of the first lens 35 is M times longer than the focal length of the first lens 30, that is, (f1/M)·M=f1. The image magnification M can be adjusted by the first lens 91 for adjusting an optical path and the second lens 92 for adjusting an optical path, as represented by Expression 5.

(Relationship Between Inclination Angle of Micromirrors and Increase in Number of Ports)

As shown in FIG. 6(*b*), when the maximum inclination angle of the micromirrors is θm, the reflection angle (the emission angle of output light) of light by the mirror array 80 is 2θm. In addition, when the position of output light that is converted into collimated light by the second lens 92 for adjusting an optical path in the Y direction is dY and the focal length of the second lens 92 for adjusting an optical path is f4, the following relational expression is obtained:

$$dY=\tan(2\theta m)\cdot f4.$$ [Expression 17]

When the angle of view of beams incident on the first lens 91 for adjusting an optical path is θ3 and the focal length of the first lens 91 for adjusting an optical path is f3, the position dY of output light in the Y direction is represented by the following relational expression:

$$dY=\tan(\theta 3)\cdot f3.$$ [Expression 18]

The following Expression 19 can be derived from Expression 17 and Expression 18:

$$\tan(2\theta m)\cdot f4=\tan(\theta 3)\cdot f3; \text{ and}$$

$$\theta 3=2\theta m\cdot f4/f3.$$ [Expression 19]

The following Expression 20 can be derived from Expression 19 and Expression 5:

$$\theta 3=2\theta m\cdot M.$$ [Expression 20]

Since the beam field angles θ1, θ2, θ2', and θ3 are the corresponding angles, Expression 20 is rearranged as follows:

$$\theta 1=2\theta m\cdot M.$$ [Expression 21]

When the focal length of the first lens is f1, the distance Pn to the outermost switchable output port is represented by the following Expression 22 from Expression 21:

$$Pn=\tan(2\theta m\cdot M)\cdot f1.$$ [Expression 22]

In the comparison between Expression 22 and Expression 4', even when the maximum inclination angles of the micromirrors are equal to each other, the distance Pn to the outermost switchable output port increases about M times. Therefore, in the wavelength selection switch 304, it is possible to increase the number of ports, without changing the pitch between the ports or the maximum inclination angle of the micromirror, as compared to the wavelength selection switch 302 according to the second embodiment.

(Beam Spot Size on Mirror Array)

When the focal length of the lens array 21 in the confocal optical system I is fo·M and the focal length of the first lens 35 is f1, the image magnification M1 of the confocal optical system I is f1/(fo·M). In addition, when the mode field diameter of the waveguide 14 is ωo, a beam spot size ω1 at the first imaging position A is represented by the following Expression 23:

$$\omega 1=\omega o\cdot f1/(fo\cdot M).$$ [Expression 23]

In addition, since the confocal optical system II has the same lens structure, the image magnification is 1. Therefore, a beam spot size ω2 at the second imaging position B is equal to the beam spot size ω1 at the first imaging position A.

Next, since a beam spot size ωm on the mirror array 80 is converted into an image with a size that is M times more than the beam spot size ωm by the optical component 90 for adjusting an optical path, the beam spot size ωm is represented by the following Expression 24:

$$\omega m=M\cdot\omega o\cdot f1/(fo\cdot M)=\omega o\cdot f1/fo.$$ [Expression 24]

Therefore, Expression 24 is equivalent to Expression 1'. This means that, even when the optical component 90 for adjusting an optical path with an image magnification of M is arranged between the confocal optical system II and the mirror array 80, the focal length of the lens array 25 is M times longer than the focal length of the lens array 20 shown in FIG. 4, and the focal length of the first lens 35 is M times longer than the focal length of the first lens 30 shown in FIG. 4, the beam spot size on the mirror array does not vary. Therefore, in the wavelength selection switch 304, it is not necessary to increase the sizes of the micromirrors of the mirror array 80 and it is possible to increase the number of input/output ports while maintaining the size of the wavelength selection switch 302 according to the second embodiment.

(Beam Spot Size on Spectral Element)

When Expression 23 indicating the beam spot size at the first imaging position A and the focal length f2/M of the second lens 50 are substituted into the Gaussian beam equation, a beam size ωg on the spectral element 60 is represented by the following Expression 25:

$$\omega g=\lambda\cdot f2\cdot fo\cdot M/(\pi\cdot\omega o\cdot f1\cdot M)$$

$$=\lambda\cdot fo\cdot f2/(\pi\cdot\omega o\cdot f1)$$ [Expression 25]

Expression 25 is equivalent to Expression 2. Even when the optical component 90 for adjusting an optical path with an image magnification of M is arranged between the confocal optical system II and the mirror array 80, the focal length of the lens array 25 is M times longer than the focal length of the lens array 20 shown in FIG. 4, and the focal length of the first lens 35 is M times longer than the focal length of the first lens 30 shown in FIG. 4, the beam size on the spectral element 60 does not vary. Therefore, in the wavelength selection switch 304, it is possible to increase the number of input/output ports while maintaining the wavelength resolution of the wavelength selection switch 302 according to the second embodiment.

(Pitch of Mirror Array)

As shown in FIG. 6(*a*), input light incident on the spectral element 60 at a predetermined angle is diffracted and branched into light components at a wavelength interval dλ at predetermined diffraction angles. The branched light is incident on the second lens 50 and is then focused on the second focal position B. The second focal position B is a real image position where light is incident on the mirror array 80 by the confocal optical system III.

When the center wavelength of the branched optical signal is λo and the wavelength interval is dλ, adjacent wavelengths can be represented by λo+dλ and λo−dλ. As described with reference to FIG. 3(*a*), a pitch Pm' of the mirror array 80' of the real image can be represented by the following Expression 26:

$$Pm'=\tan(d\beta)\cdot f2/M. \quad \text{[Expression 26]}$$

Since the pitch Pm of the mirror arrays 80 is converted M times by the confocal optical system III, the pitch Pm can be represented by the following Expression 27:

$$Pm=M\cdot Pm'=\tan(d\beta)\cdot f2. \quad \text{[Expression 15]}$$

Expression 27 is equivalent to Expression 15. This means that even when the optical component 90 for adjusting an optical path with an image magnification of M is arranged between the confocal optical system II and the mirror array 80, the focal length of the lens array 25 is M times longer than the focal length of the lens array 20 shown in FIG. 4, and the focal length of the first lens 35 is M times longer than the focal length of the first lens 30 shown in FIG. 4, the pitch of the mirror array does not vary. Therefore, in the wavelength selection switch 304, it is not necessary to increase the size of the mirror array 80 and it is possible to increase the number of input/output ports while maintaining the size of the wavelength selection switch 302 according to the second embodiment.

Furthermore, in the wavelength selection switch 304 according to the fourth embodiment, the optical path may be reflected by the spectral element, similar to the wavelength selection switch 301 according to the first embodiment with respect to the wavelength selection switch 302 according to the second embodiment.

Example

The wavelength selection switch 304 according to the fourth embodiment is compared with the wavelength selection switch according to the related art. In the wavelength selection optical switch according to the related art, when the focal length fo of the lens array is 0.5 mm, the focal length f1 of the first lens is 25 mm, the focal length f2 of the second lens is 150 mm, and the maximum inclination angle of the micromirrors of the mirror array is ±1.5 degrees, the optical path length L from the incident/emission end of the fiber array to the mirror array is 651 mm. In addition, the distance Pn from the central input port to the position where the outermost output port can be arranged is 1.31 mm. For example, when the port pitch is 0.25 mm, it is possible to arrange ten output ports.

In contrast, in the wavelength selection switch 304, when the focal length f3 of the first lens 91 for adjusting an optical path in the confocal optical system III is 5 mm and the focal length f4 of the second lens 92 for adjusting an optical path is 10 mm, that is, when the image magnification M is 2, the focal length of the lens array increases M times and the focal length of the second lens is reduced to 1/M. Therefore, the focal length fo' of the lens array is 1 mm and the focal length f2' of the second lens is 75 mm. The optical path length L' from the input/output end 10 of the fiber array 140 to the mirror array 80 is 382 mm. The optical path length is only 40 mm longer than the optical path length L' (=342) of the wavelength selection switch 302 according to the second embodiment. Therefore, it is possible to reduce the optical path length of the wavelength selection switch according to the related art by 41% and thus reduce the size of the wavelength selection switch 304.

The distance Pn from the central input port to the position where the outermost output port can be arranged is 2.62 mm. For example, when the port pitch is 0.25 mm, it is possible to arrange twenty output ports in the wavelength selection switch 304 and it is possible to provide a small wavelength selection switch with a large number of ports.

The wavelength selection switches according to the disclosure can branch light components with different wavelengths, and can be applied as an optical multiplexing/demultiplexing circuit for wavelength multiplexing or a wavelength-relocation-type add-drop wavelength multiplexing circuit when a wavelength multiplexing communication network is achieved.

What is claimed is:

1. A wavelength selection switch comprising:
an input/output end in which a plurality of input ports to which input light having one or more wavelengths is input and at least one output port from which output light is output are arranged in a straight line so as to be parallel to each other;
a lens array that is provided so as to face the input/output end, converts each input light component from the input ports into parallel light, and couples output light to the output port;
a first lens that is provided so as to face the input/output end with the lens array interposed therebetween, converges each input light component from the lens array on a focus to be diffused, converts output light into parallel light, and couples the parallel light to the lens array;
a second lens that is provided so as to face the lens array with the first lens interposed therebetween, converts each input light component from the first lens into parallel light, converges output light on a focus to be diffused, and couples the diffused light to the first lens;
a spectral element that is provided so as to face the first lens with the second lens interposed therebetween, reflects and diffracts each input light component at different angles for each wavelength from a lattice plane obtained by forming a plurality of lattices in parallel to an arrangement direction of the input and output ports of the input/output end on a plane receiving the input light such that each input light component is coupled to the second lens again, and reflects and diffracts output light components at different angles for each wavelength, similar to the input light components, such that the output light components are coupled to the second lens;
a mirror array that is provided so as to face the spectral element with the second lens interposed therebetween, deviates from a central axis connecting the first lens and the second lens, has micromirrors for each wavelength on which the input light that has been reflected from the spectral element and then focused for each wavelength by the second lens is incident for each wavelength and which are shared by the input light components for each wavelength, reflects light with a desired wavelength of the desired input light as output light such that the output light passes through the second lens, the spectral element, the second lens, the first lens, and the lens array in this order and is coupled to the output port; and
an optical component for adjusting an optical path that is provided on an optical path common to input light from the second lens to the mirror array and output light from the mirror array to the second lens and reduces the focal lengths of the first lens and the second lens.

2. The wavelength selection switch according to claim 1,
wherein the optical component for adjusting an optical path includes a first lens for adjusting an optical path and a second lens for adjusting an optical path in this order from an input light incident side, and
the first lens for adjusting an optical path and the second lens for adjusting an optical path form a confocal optical system.

3. The wavelength selection switch according to claim 2,
wherein the focal length of the second lens for adjusting an optical path is longer than that of the first lens for adjusting an optical path.

4. The wavelength selection switch according to claim 3,
wherein the first lens for adjusting an optical path is a convex lens or a concave lens.

5. The wavelength selection switch according to claim 1,
wherein, when the image magnification of the optical component for adjusting an optical path is M, the focal length of each of the lens array and the first lens is M times longer than that of each of the lens array and the first lens according to claim 1.

6. A wavelength selection switch comprising:
an input/output end in which a plurality of input ports to which input light having one or more wavelengths is input and at least one output port from which output light is output are arranged in a straight line so as to be parallel to each other;
a lens array that is provided so as to face the input/output end, converts each input light component from the input ports into parallel light, and couples output light to the output port;
a first lens that is provided so as to face the input/output end with the lens array interposed therebetween, converges each input light component from the lens array on a focus to be diffused, converts output light into parallel light, and couples the parallel light to the lens array;
a second lens that is provided so as to face the lens array with the first lens interposed therebetween, converts each input light component from the first lens into parallel light, converges output light on a focus to be diffused, and couples the diffused light to the first lens;
a spectral element that is provided so as to face the first lens with the second lens interposed therebetween, transmits and diffracts each input light component at different angles for each wavelength through a lattice plane obtained by forming a plurality of lattices in parallel to an arrangement direction of the input and output ports of the input/output end on a plane receiving the input light, and transmits and diffracts output light components at different angles for each wavelength, similar to the input light components, such that the output light components are coupled to the second lens;
a third lens that is provided so as to face the second lens with the spectral element interposed therebetween, focuses input light components, which are separated for each wavelength, from the spectral element for each wavelength, converts output light into parallel light, and couples the parallel light to the spectral element;
a mirror array that is provided so as to face the spectral element with the third lens interposed therebetween, has micromirrors for each wavelength on which the input light components focused by the third lens are incident for each wavelength and which are shared by the input light components, reflects light with a desired wavelength of the desired input light as output light such that the output light passes through the third lens, the spectral element, the second lens, the first lens, and the lens array in this order and is coupled to the output port; and
an optical component for adjusting an optical path that is provided on an optical path common to input light from the third lens to the mirror array and output light from the mirror array to the third lens and reduces the focal lengths of the first lens and the second lens.

7. The wavelength selection switch according to claim 6,
wherein the optical component for adjusting an optical path includes a first lens for adjusting an optical path and a second lens for adjusting an optical path in this order from an input light incident side, and
the first lens for adjusting an optical path and the second lens for adjusting an optical path form a confocal optical system.

8. The wavelength selection switch according to claim 7,
wherein the focal length of the second lens for adjusting an optical path is longer than that of the first lens for adjusting an optical path.

9. The wavelength selection switch according to claim 8,
wherein the first lens for adjusting an optical path is a convex lens or a concave lens.

10. The wavelength selection switch according to claim 6,
wherein, when the image magnification of the optical component for adjusting an optical path is M, the focal length of each of the lens array and the first lens is M times longer than that of each of the lens array and the first lens according to claim 6.

* * * * *